(12) United States Patent
Kim et al.

(10) Patent No.: US 10,074,458 B2
(45) Date of Patent: Sep. 11, 2018

(54) INSULATION FILM AND FLEXIBLE FLAT CABLE

(71) Applicant: DOOSAN CORPORATION, Seoul (KR)

(72) Inventors: Sung-Moon Kim, Seongnam-si (KR); Kwang-Seok Park, Yongin-si (KR); Eui-Dock Ryu, Suwon-si (KR); In-Ki Jeong, Yongin-si (KR); Su-Byung Park, Yongin-si (KR)

(73) Assignee: DOOSAN CORPORATION, Seoul (KR)

( * ) Notice: Subject to any disclaimer, the term of this patent is extended or adjusted under 35 U.S.C. 154(b) by 0 days.

(21) Appl. No.: 15/329,121

(22) PCT Filed: Jul. 26, 2016

(86) PCT No.: PCT/KR2016/008152
§ 371 (c)(1),
(2) Date: Jan. 25, 2017

(87) PCT Pub. No.: WO2017/018774
PCT Pub. Date: Feb. 2, 2017

(65) Prior Publication Data
US 2017/0207002 A1 Jul. 20, 2017

(30) Foreign Application Priority Data

Jul. 28, 2015 (KR) .................. 10-2015-0106762

(51) Int. Cl.
*B32B 7/12* (2006.01)
*B32B 27/06* (2006.01)
(Continued)

(52) U.S. Cl.
CPC ............... *H01B 3/421* (2013.01); *B32B 7/12* (2013.01); *B32B 27/06* (2013.01); *B32B 27/36* (2013.01);
(Continued)

(58) Field of Classification Search
CPC ... H01B 3/42; H01B 7/04; H01B 7/08; H01B 7/295; H01B 17/56; H01B 13/14;
(Continued)

(56) References Cited

U.S. PATENT DOCUMENTS 7,732,045 B2 * 6/2010 Nakao .................. C08J 5/22
428/339
8,975,522 B2 * 3/2015 Shanai ................. C09J 177/08
174/117 A
(Continued)

FOREIGN PATENT DOCUMENTS

EP  0 992 557    4/2000
EP  3 089 170    11/2016
(Continued)

OTHER PUBLICATIONS

International Searching Authority, International Search Report for PCT/KR2016/008152 dated Oct. 12, 2016 [PCT/ISA/210].
(Continued)

*Primary Examiner* — Timothy Thompson
*Assistant Examiner* — Michael F McAllister
(74) *Attorney, Agent, or Firm* — Sughrue Mion, PLLC

(57) ABSTRACT

The present disclosure relates to an insulation film capable of being used in a flexible flat cable(FFC) and having excellent flexibility and mechanical properties, and a flexible flat cable (FFC) using the insulation film. The insulation film provided in the present disclosure has very excellent mechanical properties such as tensile strength, elongation and flexibility, and also has very excellent heat-resisting
(Continued)

properties such as contractibility and degeneration caused by heat. In addition, by using the insulation film, the flexible flat cable provided in the present disclosure also has very excellent mechanical properties and heat-resisting properties.

21 Claims, 3 Drawing Sheets

(51) Int. Cl.
*B32B 27/36* (2006.01)
*H01B 7/04* (2006.01)
*H01B 7/08* (2006.01)
*H01B 7/295* (2006.01)
*H01B 3/42* (2006.01)

(52) U.S. Cl.
CPC ............ *H01B 7/04* (2013.01); *H01B 7/08* (2013.01); *H01B 7/295* (2013.01); *B32B 2307/206* (2013.01); *B32B 2307/3065* (2013.01)

(58) Field of Classification Search
CPC .... H01B 13/144; H01B 7/0823; H01B 17/60; H01B 3/30; B32B 27/06; B32B 27/36; B32B 7/12; C09J 11/02; C09J 179/08; C09J 201/00; C09J 7/02
USPC ........................................................ 174/255
See application file for complete search history.

(56) References Cited

U.S. PATENT DOCUMENTS

| | | | | |
|---|---|---|---|---|
| 9,123,836 B2* | 9/2015 | Kataoka | ............... | C08J 5/18 |
| 9,282,639 B2* | 3/2016 | Shanai | ............... | H05K 3/20 |
| 9,525,091 B2* | 12/2016 | Takanashi | ............... | B32B 27/08 |
| 2002/0170740 A1* | 11/2002 | Yamanobe | ........... | H01B 7/0838 |
| | | | | 174/117 F |
| 2002/0195266 A1* | 12/2002 | Yosomiya | ............ | H01B 7/0838 |
| | | | | 174/117 F |
| 2003/0019659 A1* | 1/2003 | Yamanobe | ........... | H01B 7/0838 |
| | | | | 174/117 FF |
| 2004/0068061 A1* | 4/2004 | Kawate | .................. | C08G 59/18 |
| | | | | 525/530 |
| 2006/0127645 A1* | 6/2006 | Imamura | .................. | H01B 3/18 |
| | | | | 428/170 |
| 2013/0043058 A1 | 2/2013 | Shanai | | |
| 2013/0206451 A1* | 8/2013 | Arai | ....................... | H01B 7/295 |
| | | | | 174/119 R |
| 2013/0233590 A1* | 9/2013 | Shanai | ....................... | C09J 7/02 |
| | | | | 174/117 F |
| 2013/0327396 A1* | 12/2013 | Akaike | ..................... | B32B 7/12 |
| | | | | 136/256 |
| 2014/0202737 A1* | 7/2014 | Shanai | ................ | H05K 1/0298 |
| | | | | 174/251 |
| 2015/0206626 A1 | 7/2015 | Amano et al. | | |

FOREIGN PATENT DOCUMENTS

| | | |
|---|---|---|
| JP | 2013-175341 A | 9/2013 |
| JP | 2013-213204 A | 10/2013 |
| KR | 10-2000-0023728 A | 4/2000 |
| KR | 10-0894443 B1 | 4/2009 |
| KR | 10-2012-0069602 A | 6/2012 |

OTHER PUBLICATIONS

European Patent Office, Communication dated Mar. 5, 2018 by the European Patent Office in Application No. 16 830 807.0.

* cited by examiner

INSULATION FILM AND FLEXIBLE FLAT CABLE

CROSS REFERENCE TO RELATED APPLICATIONS

This application is a National Stage of International Application No. PCT/KR2016/008152, filed on Jul. 26, 2016, which claims priority from Korean Patent Application No. 10-2015-0106762, filed on Jul. 28, 2015, the contents of all of which are incorporated herein by reference in their entirety.

TECHNICAL FIELD

The present disclosure relates to an insulation film capable of being used in a flexible flat cable (FFC) and having excellent mechanical properties and thermal properties, and a flexible flat cable (FFC) using the insulation film.

BACKGROUND ART

Flexible flat cables (FFC) have been much used in computers, liquid crystal display devices, mobile phones, printers, automobiles, home appliances, copy machines and other various electronic, electric and mechanical products for electrical connections requiring flexibility or mobility, or various forms of wiring. Such flexible flat cables (FFC) generally have a structure in which an adhesive-applied substrate film and the like are attached to a single surface or both surfaces of a single conductor or a plurality of conductors to cover the conductors.

Flexible flat cable (FFC) are used in electronic devices or machines having motions such as rotation or sliding movements, and used for smoothly transferring electric signals even in exothermic environments by the operation of the electronic devices and the motion of the machines while flexibly transforming with structural changes caused by the motion of the electronic devices or the machines. As a result, an insulation film for a flexible flat cable (FFC) covering the flexible flat cable (FFC) requires tensile strength and flexibility for motions such as rotation or sliding movements, and requires high stability at high temperatures and flame retardancy.

As such an insulation film for a flexible flat cable (FFC), Japanese Patent Application Laid-Open Publication No. H08-60108 discloses a non-halogen flame retarding flat cable using an adhesive layer formed with a polyimide film and a phosphorous-modified saturated polyester copolymer.

However, there is a problem in that such an insulation film does not have sufficient tensile strength and flexibility properties.

DISCLOSURE

Technical Problem

The present disclosure is directed to providing an insulation film having excellent mechanical properties such as tensile strength, elongation and flexibility, and heat-resisting properties such as contractibility and degeneration caused by heat, and a flexible flat cable (FFC) using the insulation film.

Technical Solution

One embodiment of the present disclosure provides an insulation film in which an adhesive layer, an interlayer and a resin layer are consecutively laminated, wherein a ratio of tensile strength after maintaining for 1000 hours under a condition of a temperature of 85° C. and humidity of 85% ($T_H$) with respect to tensile strength at room temperature ($T_R$) of the insulation film ($T_H/T_R$) may be from 0.9 to 1.0.

In the embodiment of the present disclosure, the tensile strength ($T_H$) of the insulation film after maintaining for 1000 hours under a condition of a temperature of 85° C. and humidity of 85% may be from 115 MPa to 135 MPa.

In the embodiment of the present disclosure, the tensile strength ($T_R$) of the insulation film under a room temperature condition may be from 130 MPa to 140 MPa.

In the embodiment of the present disclosure, a machine direction (MD) contraction rate of the insulation film may be from 0.20% to 0.35%, and a transverse direction (TD) contraction rate of the insulation film may be from 0.08% to 0.13%.

In the embodiment of the present disclosure, a ratio of the machine direction contraction rate with respect to the transverse direction contraction rate (MD/TD) of the insulation film may be from 2.5 to 3.0.

In the embodiment of the present disclosure, the adhesive layer may include a polymer resin.

In the embodiment of the present disclosure, the polymer resin may include a polyester (PE) resin.

In the embodiment of the present disclosure, the polymer resin may include two or more types of polyester (PE) resins, and as the polyester (PE) resin, a first polyester (PE) resin having a molecular weight of 1,000 to 15,000 and a second polyester (PE) resin having a molecular weight of 20,000 to 35,000 may be mixed and used.

In the embodiment of the present disclosure, the adhesive layer may include one or more types of curing agents.

In the embodiment of the present disclosure, the curing agent may be a compound including at least one functional group among an isocyanate group, a block isocyanate group and a carbodiimide group.

In the embodiment of the present disclosure, the curing agent may be included in an amount of 6 parts by weight to 60 parts by weight with respect to 50 parts by weight of the polymer resin.

In the embodiment of the present disclosure, the adhesive layer may further include one or more types of flame-retardant fillers.

In the embodiment of the present disclosure, the flame-retardant filler may be one or more types selected from the group consisting of a halogen flame retardant, a phosphorous-based flame retardant, a nitrogen-based flame retardant, a metal-based flame retardant and an antimony-based flame retardant.

Another embodiment of the present disclosure provides an insulation film in which an adhesive layer, an interlayer and a resin layer are consecutively laminated, wherein elongation of the insulation film after maintaining for 1000 hours under a condition of a temperature of 85° C. and humidity of 85% ($E_H$) is from 85% to 105%.

In the embodiment of the present disclosure, tensile strength ($T_H$) of the insulation film after maintaining for 1000 hours under a condition of a temperature of 85° C. and humidity of 85% may be from 115 MPa to 135 MPa.

In the embodiment of the present disclosure, tensile strength ($T_R$) of the insulation film under a room temperature condition may be from 130 MPa to 140 MPa.

In the embodiment of the present disclosure, a machine direction (MD) contraction rate of the insulation film may be from 0.20% to 0.35%, and a transverse direction (TD) contraction rate of the insulation film may be from 0.08% to 0.13%.

In the embodiment of the present disclosure, a ratio of the machine direction contraction rate with respect to the transverse direction contraction rate (MD/TD) of the insulation film may be from 2.5 to 3.0.

In the embodiment of the present disclosure, the adhesive layer may include a polymer resin.

In the embodiment of the present disclosure, the polymer resin may include a polyester (PE) resin.

In the embodiment of the present disclosure, the polymer resin may include two or more types of polyester (PE) resins, and the polyester (PE) resin may include a first polyester (PE) resin having a molecular weight of 1,000 to 15,000 and a second polyester (PE) resin having a molecular weight of 20,000 to 35,000.

In the embodiment of the present disclosure, the adhesive layer may include one or more types of curing agents.

In the embodiment of the present disclosure, the curing agent may be a compound including at least one functional group among an isocyanate group, a block isocyanate group and a carbodiimide group.

In the embodiment of the present disclosure, the curing agent may be included in an amount of 6 parts by weight to 60 parts by weight with respect to 50 parts by weight of the polymer resin.

In the embodiment of the present disclosure, the adhesive layer may further include one or more types of flame-retardant fillers.

In the embodiment of the present disclosure, the flame-retardant filler may be one or more types selected from the group consisting of a halogen flame retardant, a phosphorous-based flame retardant, a nitrogen-based flame retardant and a metal-based flame retardant.

Still another embodiment of the present disclosure provides a flexible flat cable (FFC) including a conductor; and the insulation film according to one embodiment or another embodiment laminated on at least one surface of the conductor.

In the flexible flat cable (FFC) of the present disclosure, a peel strength value of the conductor for the adhesive layer after maintaining for 1000 hours under a condition of a temperature of 85° C. and humidity of 85% may be from 0.75 kg/cm to 1.00 kg/cm.

Advantageous Effects

An insulation film provided in the present disclosure has very excellent mechanical properties such as tensile strength, elongation and flexibility, and also has very excellent heat-resisting properties such as contractibility and degeneration caused by heat.

In addition, by using the insulation film, a flexible flat cable provided in the present disclosure also has very excellent mechanical properties and heat-resisting properties.

MODE FOR DISCLOSURE

The present disclosure relates to an insulation film in which an adhesive layer, an interlayer and a resin layer are consecutively laminated, wherein a ratio of tensile strength after maintaining for 1000 hours under a condition of a temperature of 85° C. and humidity of 85% ($T_H$) with respect to tensile strength at room temperature ($T_R$) of the insulation film ($T_H/T_R$) may be from 0.9 to 1.0.

Hereinafter, preferred embodiments of the present disclosure will be described. However, embodiments of the present disclosure may be modified to various other forms, and the scope of the present disclosure is not limited to the embodiments described below. In addition, embodiments of the present disclosure are provided in order to more completely describe the present disclosure to those having average knowledge in the corresponding technology field.

Flexible flat cables (FFC) recently used in the fields of various electronic devices or automobiles are normally used under a high temperature environment due to the heat coming from electronic components, and therefore, properties such as high tensile strength and elongation under a severe condition such as high temperature and high humidity are required.

The inventors of the present disclosure have found out an insulation film capable of maintaining mechanical properties such as high tensile strength and elongation, and flexibility under a severe condition as above, and have completed the present disclosure.

Figure 1:
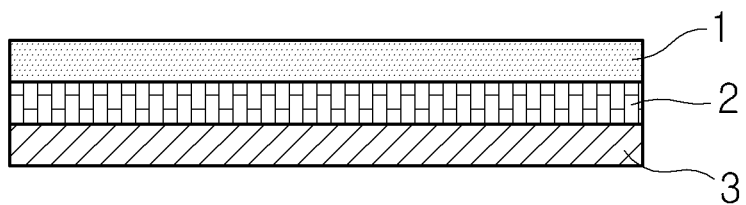
FIG. 1 schematically shows a sectional structure of an insulation film according to one embodiment of the present disclosure.

Specifically, the present disclosure relates to an insulation film in which an adhesive layer, an interlayer and a resin layer are consecutively laminated, and FIG. 1 schematically shows a sectional structure of the insulation film according to one embodiment of the present disclosure, wherein an interlayer (2) is laminated on a resin layer (3) and an adhesive layer (1) is laminated on the interlayer (2).

Herein, the adhesive layer (1) performs a role of adhering and binding the insulation film to a conductor, and the interlayer (2) is located between the adhesive layer (1) and the resin layer (3) and performs a role of supplementing insufficient binding capacity of the adhesive layer (1) and the resin layer (3) when they directly bind, and the resin layer (3) is located at an outermost place of the insulation film so as to insulate the conductor from the outside.

According to one embodiment of the present disclosure, a ratio of tensile strength after maintaining for 1000 hours under a condition of a temperature of 85° C. and humidity of 85% ($T_H$) with respect to tensile strength at room temperature ($T_R$) of the insulation film ($T_H/T_R$) is from 0.9 to 1.0 and more preferably from 0.93 to 1.0.

In the present specification, the term 'room temperature' means a natural temperature without raising or lowering the temperature, and for examples, means a temperature of approximately 15° C. to 35° C., approximately 20° C. to 25° C., and approximately 25° C. or 23° C.

In the present disclosure, a ratio of tensile strength after maintaining for 1000 hours under a severe condition of a temperature of 85° C. and humidity of 85% ($T_H$) with respect to tensile strength at room temperature ($T_R$) of the insulation film ($T_H/T_R$) is 0.9 or greater, and even under a severe condition, mechanical properties the same as and similar to mechanical properties under a room temperature condition may be maintained. However, when the $T_H/T_R$ ratio is less than 0.9, cross-linked chains in a polymer resin included in the adhesive layer or the interlayer are cut, and as a result, mechanical strength and flexibility may significantly decline. Accordingly, in the present disclosure, controlling the ratio of tensile strength after maintaining for 1000 hours under a condition of a temperature of 85° C. and humidity of 85% ($T_H$) with respect to tensile strength at room temperature ($T_R$) of the insulation film ($T_H/T_R$) to 0.9 or greater is preferable, however, when considering practicability and economic conditions, controlling the ratio to 1.0 or less is preferable.

In addition, according to another embodiment of the present disclosure, after maintaining the insulation film for 1000 hours under a condition of a temperature of 85° C. and humidity of 85%, that is, under a severe condition, elongation ($E_H$) is high of 85% to 105%.

In the present disclosure, tensile strength of the insulation film at room temperature ($T_R$) may be high of 130 MPa to 140 MPa.

Moreover, in the present disclosure, tensile strength (TH) of the insulation film after maintaining the insulation film for 1000 hours under a severe condition of a temperature of 85° C. and humidity of 85% may also be very high of 115 MPa to 135 MPa.

In addition, in the present disclosure, the insulation film provided as above has a machine direction (MD) contraction rate of 0.20% to 0.35% and a transverse direction (TD) contraction rate of 0.08% to 0.13%, and by controlling a ratio of the machine direction contraction rate with respect to the transverse direction contraction rate (MD/TD) to 2.5 to 3.0, a heat contraction rate property may be further enhanced.

The adhesive layer in the insulation film of the present disclosure may include a polymer resin, and herein, one or more types selected from the group consisting of a polyester (PE)-based resin, a polyimide-based resin, a polyethylene-based resin, a polyurethane-based resin and a polyphenylene sulfide-based resin may be used as the polymer resin, and preferably, a polyester (PE) resin may be mandatorily included.

In the present disclosure, as the polyester resin capable of being used as the polymer resin, two or more types of polyester resins may be preferably used. More preferably, a first polyester (PE) resin having a molecular weight of 1,000 to 15,000, a second polyester (PE) resin having a molecular weight of 20,000 to 35,000, or a mixture thereof may be used, and even more preferably, two or more types of first polyester (PE) resins, two or more types of second polyester (PE) resins, or a mixture of one or more types of first polyester (PE) resins and one or more types of second polyester (PE) resins may be used, and most preferably, a mixture of one or more types of first polyester (PE) resins and one or more types of second polyester (PE) resins may be used.

However, types of the polyester resin capable of being used in the present disclosure are not limited to the above-mentioned types, and the polyester resin may be selectively used depending on the properties of products to obtain.

In addition, in the insulation film of the present disclosure, the adhesive layer preferably includes one or more types of curing agents.

Herein, types of the curing agent may include a compound including at least one functional group among an isocyanate group, a block isocyanate group and a carbodiimide group.

More specifically, multifunctional isocyanate such as 2,4-tolylene diisocyanate, 2,6-tolylene diisocyanate, diphenylmethane-4,4'-diisocyanate, xylene diisocyanate, isophorone diisocyanate, polyethylene phenyl diisocyanate and hexamethylene diisocyanate, polyol-modified materials and carbodiimide-modified materials of isocyanates thereof, block-type isocyanate masking isocyanates thereof with alcohol, phenol, lactam, amine and the like, and the like, may be used, however, the curing agent is not limited thereto.

In addition, in the present disclosure, including the curing agent in an amount of 6 parts by weight to 60 parts by weight, preferably in 6 parts by weight to 26 parts by weight, and more preferably in 8 parts by weight to 22 parts by weight, and even more preferably in 8 parts by weight to 18 parts by weight with respect to 50 parts by weight of the polymer resin included in the adhesive layer may further enhance mechanical properties such as tensile strength, elongation and a heat contraction rate, and flexibility. When the polymer resin content is 100 parts by weight, the curing agent content may increase twofold.

In the present disclosure, the above-mentioned effects may be obtained when a minimum of 6 parts by weight of the curing agent is used with respect to 50 parts by weight of the polymer resin, and more preferably, 8 parts by weight or more of the curing agent needs to be used in order to obtain excellent mechanical properties even under a severe condition when using since the curing agent performs sufficient cross-linking between polyesters. However, when the curing agent is used in greater than 26 parts by weight, the adhesive layer becomes hard reducing flexibility, and elongation may also decline.

In addition, the present disclosure may further include one or more types of flame-retardant fillers to provide flame retardancy to the adhesive layer.

Herein, types of the flame-retardant filler are not particularly limited, however, with the addition of the flame-retardant filler, a flexible flat cable (FFC) according to the present disclosure preferably provides flame retardancy passing UL standard vertical flame test (VW-1 test).

More specifically, as the flame-retardant filler, one or more types selected from the group consisting of a halogen flame retardant, a phosphorous-based flame retardant, a nitrogen-based flame retardant, a metal-based flame retardant and an antimony-based flame retardant may be used, and preferably, a mixture of greater than or equal to one type and less than or equal to seven types may be used, and more preferably, a mixture of greater than or equal to three types and less than or equal to five types may be used.

In the present disclosure, specific examples of the flame retardant may include chlorine-based flame retardants such as chlorinated paraffin, chlorinated polyethylene, chlorinated polyphenyl and perchloropentacyclodecane; bromine-based flame retardants such as ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane and brominated ammonium; phosphate esters or phosphorous compounds such as triallyl phosphate, alkylallyl phosphate, alkyl phosphate, dimethyl phosphonate, phospolynate, halogenated phospolynate ester, trimethyl phosphate, tributyl phosphate, trioctyl phosphate, tributoxyethyl phosphate, octyldiphenyl phosphate, tricredyl phosphate, credylphenyl phosphate, triphenyl phosphate, tris(chloroethyl) phosphate, tris(2-chloropropyl) phosphate, tris(2,3-dichloropropyl) phosphate, tris(2,3-dibromopropyl) phosphate, tris(bromochloropropyl) phosphate, bis(2,3-dibromopropyl)2,3-dichloropropyl phosphate, bis(chloropropyl)monooctyl phosphate, polyphosphonate, polyphosphate, aromatic polyphosphate, dibromoneopentyl glycol and tris(diethylphosphinic acid)aluminum; polyols such as phosphonate-type polyol, phosphate-type polyol and halogen element-containing polyol; metals or inorganic compounds such as aluminum hydroxide, magnesium hydroxide, magnesium carbonate, antimony trioxide, antimony trichloride, zinc borate, antimony borate, boric acid, antimony molybdate, molybdenum oxide, phosphorous nitrogen compounds, calcium aluminum silicate, titanium dioxide, zirconium compounds, tin compounds, dosonite, calcium aluminate hydrate, copper oxide, copper metal, calcium carbonate and barium metaborate; nitrogen compounds such as melamine cyanurate, triazine, isocyanurate, urea and guanidine; and other compounds such as silicone-based polymers, ferrocene, fumaric acid and maleic acid. Among these, halogen-based flame retardants such as bromine-based flame retardants and chlorine-based flame retardants are preferable.

In the present disclosure, content of the flame-retardant filler is not particularly limited, however, including the flame-retardant filler in 5 parts by weight or greater, preferably in 10 parts by weight or greater, and more preferably in 15 parts by weight or greater with respect to 50 parts by weight of the polymer resin is preferable since sufficient flame retardancy may be provided to the adhesive layer, and the upper limit may be 75 parts by weight, preferably 65 parts by weight and more preferably 60 parts by weight. When the flame-retardant filler content exceeds the above-mentioned upper limit value, sufficient flame retardancy improving effect is not obtained compared to an increase in the added amount, which may cause an economical problem, and flexibility may decline and elongation may also decline due to an increase in the filler content.

In the present disclosure, a flame retardant aid, a pigment, an antioxidant, a concealing agent, a lubricant, a process stabilizer, a plasticizer, a foaming agent reinforcing material, a coloring agent, a filler, a granule, a metal deactivating agent, a silane coupling agent and the like may be further included in the adhesive layer within the range that does not harm properties such as mechanical properties, flexibility and flame retardancy of the insulation film.

Another embodiment of the present disclosure provides a flexible flat cable (FFC) including a conductor; and the insulation film according to one embodiment or another embodiment of the present disclosure laminated on at least one surface of the conductor, and thereby having very excellent mechanical properties, flexibility and flame retardancy.

Figure 2:
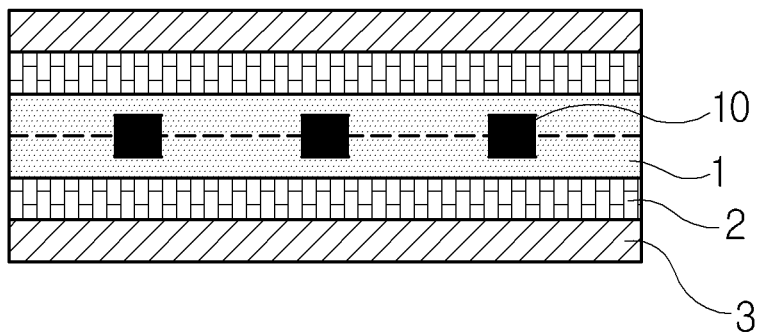
FIG. 2 schematically shows a sectional structure of a flexible flat cable according to one embodiment of the present disclosure.

FIG. 2 schematically shows a sectional structure of the flexible flat cable according to one embodiment of the present disclosure, and adhesive layers (1) are laminated on both surfaces of a conductor (10), an interlayer (2) is laminated on another surface of the adhesive layer (1), and a resin layer (3) is laminated on another surface of the interlayer (2).

In the flexible flat cable (FFC) of the present disclosure, a peel strength value of the conductor for the adhesive layer under a condition of a temperature of 85° C. and humidity of 85% may be from 0.75 kg/cm to 1.00 kg/cm.

In the present disclosure, types of the conductor are not particularly limited, and the conductor may be formed with conductive metals such as copper, tin-plated copper and nickel-plated copper. As the conductor, conductive metals having a foil shape are preferable.

Still another embodiment of the present disclosure provides a method for preparing an insulation film including preparing a first solvent by mixing and synthesizing one or more types of polyester resins, one or more types of curing agents and one or more types of flame retarding fillers; preparing a second solvent by mixing and synthesizing one or more types of polyester resins, one or more types of curing agents and an inorganic filler; forming an interlayer by coating the second solvent on a resin layer; and forming an adhesive layer by coating the first solvent on the interlayer and drying the result.

In the method for preparing an insulation film of the present disclosure, descriptions on the polyester resin, the curing agent and the flame retarding filler are the same as those described in the insulation film, and therefore, specific descriptions thereon will not be repeated.

In the present disclosure, types of the inorganic filler used in the preparation of the second solvent are not particularly limited, and examples thereof may include silica ($SiO_2$).

Yet another embodiment of the present disclosure provides a method for preparing a flexible flat cable including preparing two insulation films according to the present disclosure; and providing a conductor between adhesive layers of the two insulation films, and laminating the result.

In the present disclosure, a step of cutting the insulation film to a desired size may be carried out prior to attaching the insulation film to the conductor.

EXAMPLES

Hereinafter, the present disclosure will be described in more detail with reference to specific examples. However, the following examples are for illustrative purposes only, and the scope of the present disclosure is not limited thereto.

Examples 1 to 6 and Comparative Examples 1 to 6

25 parts by weight of each of a reactive polyester resin (molecular weight 8,000/glass transition temperature 61° C.) and a reactive polyester resin (molecular weight 30,000/glass transition temperature 80° C.) was dissolved in a solvent formed with 80 parts by weight of toluene and 90 parts by weight of methyl ethyl ketone to prepare a resin solution, 50 parts by weight of a flame-retardant filler was added thereto to improve a flame retarding property, and then an isocyanate curing agent was added thereto in the content listed in the following Table 1 to prepare a first solvent for an adhesive layer having 2,000 cps or greater. The isocyanate curing agent is a factor affecting the rigidness of the resin composition, and was introduced immediately before coating when preparing a mixture. In addition, 20 parts by weight of silica was added with respect to 80 parts by weight of a mixed resin of a polyester resin (molecular weight 5,000/glass transition temperature 51° C.) and a reactive polyester resin (molecular weight 20,000/glass transition temperature 35° C.) to prepare a second solvent for an interlayer. The second solvent was coated on one surface of an oriented polyethylene film in a coating amount of 10 $g/m^2$ using a comma coating method, and the result was dried to form an interlayer, and the first solvent was coated on the interlayer in a coating amount of 100 $g/m^2$, and the result was dried to form an adhesive layer having a thickness of 20 μm.

TABLE 1

| Category | Composition (Parts by Weight) | | | |
|---|---|---|---|---|
| | First Polyester (Molecular Weight 1,000 to 15,000) | Second Polyester (Molecular Weight 20,000 to 35,000) | Curing Agent | Flame-Retardant Filler |
| Example 1 | 25 | 25 | 8 | 50 |
| Example 2 | 25 | 25 | 10 | 50 |
| Example 3 | 25 | 25 | 14 | 50 |
| Example 4 | 25 | 25 | 18 | 50 |
| Example 5 | 25 | 25 | 22 | 50 |
| Example 6 | 25 | 25 | 26 | 50 |
| Comparative Example 1 | 25 | 25 | 1 | 50 |
| Comparative Example 2 | 25 | 25 | 3 | 50 |
| Comparative Example 3 | 25 | 25 | 5 | 50 |
| Comparative Example 4 | 25 | 25 | — | 50 |
| Comparative Example 5 | 50 | — | 14 | 50 |
| Comparative Example 6 | — | 50 | 14 | 50 |

Test Example 1

For the insulation films prepared in Examples 1 to 6 and Comparative Examples 1 to 6, tensile strength of the insulation film of each sample under a room temperature condition ($T_R$) and after maintaining the insulation film for 1000 hours under a condition of a temperature of 85° C. and humidity of 85% ($T_H$) was evaluated using a tensile tester, and the results are shown in the following Table 2, and a relation between the curing agent content and $T_H/T_R$ in Examples 1 to 6 and Comparative Examples 1 to 4 is shown on a graph in FIG. 3.

TABLE 2

| Category | Curing Agent Content (Parts by Weight) | $T_R$ (MPa) | $T_H$ (MPa) | $T_H/T_R$ |
|---|---|---|---|---|
| Example 1 | 8 | 134 | 128 | 0.96 |
| Example 2 | 10 | 138 | 131 | 0.95 |
| Example 3 | 14 | 139 | 129 | 0.93 |
| Example 4 | 18 | 135 | 125 | 0.93 |
| Example 5 | 22 | 131 | 118 | 0.90 |
| Example 6 | 26 | 130 | 117 | 0.90 |
| Comparative Example 1 | 1 | 115 | 88 | 0.77 |
| Comparative Example 2 | 3 | 119 | 94 | 0.79 |
| Comparative Example 3 | 5 | 128 | 108 | 0.84 |
| Comparative Example 4 | — | 112 | 75 | 0.67 |
| Comparative Example 5 | 14 | 89 | 72 | 0.81 |
| Comparative Example 6 | 14 | 111 | 90 | 0.81 |

Figure 3:
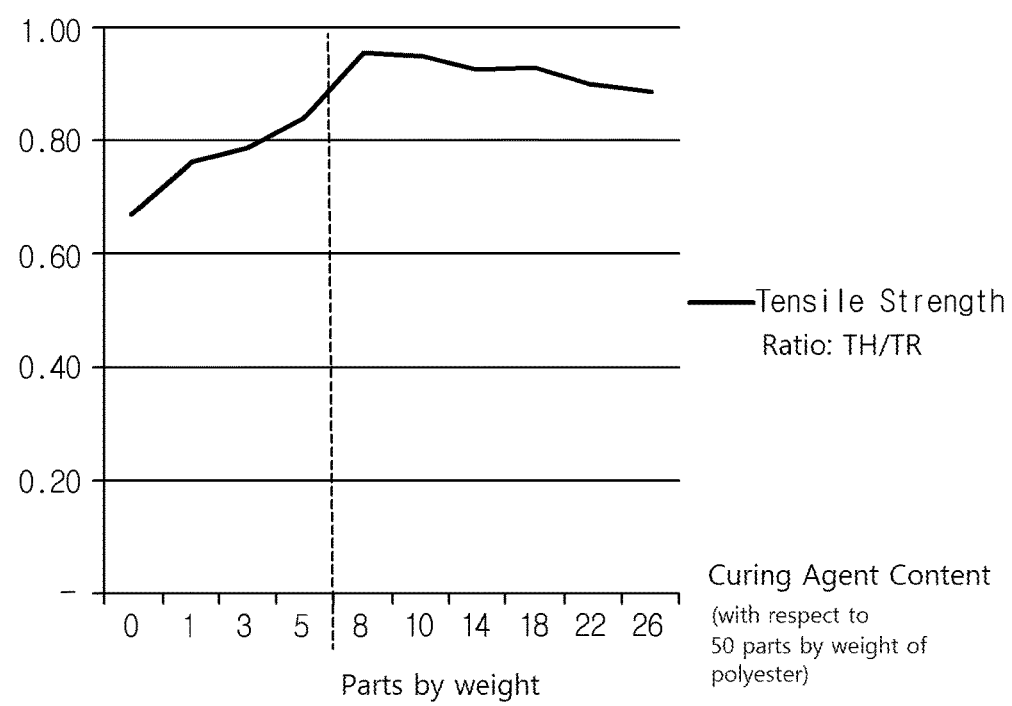
FIG. 3 shows a relation between curing agent content and $T_H/T_R$ in Examples 1 to 6 and Comparative Examples 1 to 4 of Test Example 1 on a graph.

As shown in Table 2 and FIG. 3, the insulation films of Examples 1 to 6 according to the present disclosure had a $T_H/T_R$ in a range of 0.90 to 0.96, and it was seen that properties in a severe condition were very superior compared to a room temperature condition. However, in Comparative Examples 1 to 6, it was seen that mechanical properties in a severe condition highly declined compared to a room temperature condition.

Test Example 2

For the insulation films prepared in Examples 1 to 6 and Comparative Examples 1 to 6, elongation under a room temperature condition ($E_R$) and elongation after maintaining for 1000 hours under a temperature of 85° C. and humidity of 85% ($E_H$) were evaluated, and the results are shown in the following Table 3, and a relation between the curing agent content and $E_H$ in Examples 1 to 6 and Comparative Examples 1 to 4 is shown as a graph in FIG. 4.

TABLE 3

| Category | Curing Agent Content (Parts by Weight) | $E_R$ (%) | $E_H$ (%) |
|---|---|---|---|
| Example 1 | 8 | 120 | 92 |
| Example 2 | 10 | 123 | 97 |
| Example 3 | 14 | 125 | 103 |
| Example 4 | 18 | 121 | 105 |
| Example 5 | 22 | 104 | 89 |
| Example 6 | 26 | 109 | 85 |
| Comparative Example 1 | 1 | 104 | 77 |
| Comparative Example 2 | 3 | 109 | 78 |
| Comparative Example 3 | 5 | 117 | 82 |
| Comparative Example 4 | — | 98 | 75 |
| Comparative Example 5 | 14 | 85 | 75 |
| Comparative Example 6 | 14 | 88 | 76 |

Figure 4:
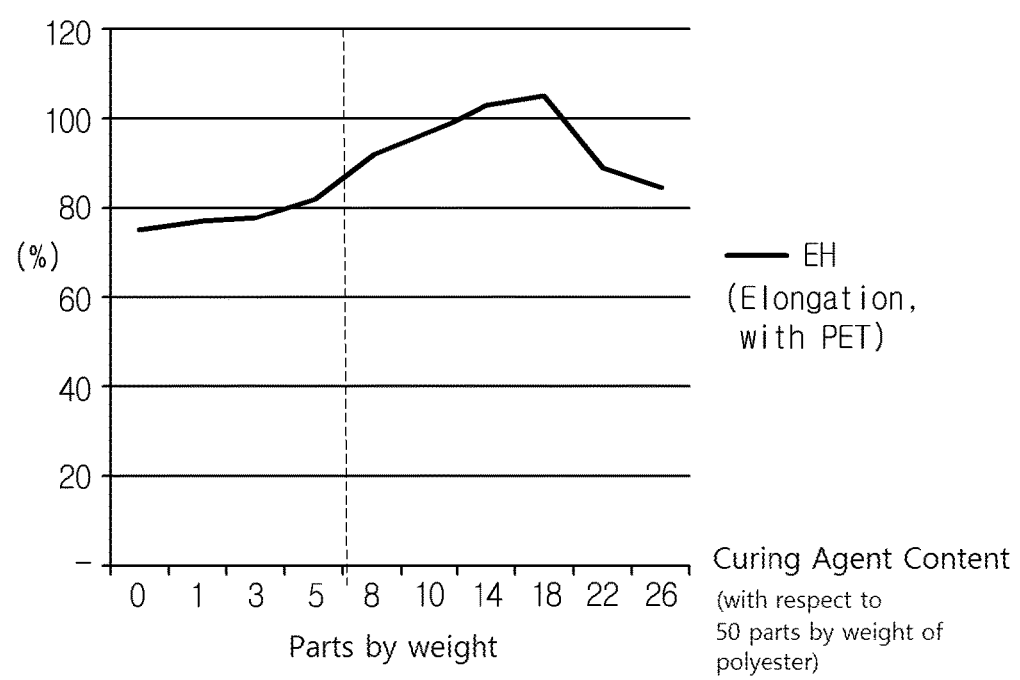
FIG. 4 shows a relation between curing agent content and $E_H$ in Examples 1 to 6 and Comparative Examples 1 to 4 of Test Example 2 on a graph.

As shown in Table 3 and FIG. 4, it was seen that the insulation films of Examples 1 to 6 according to the present disclosure had high elongation ($E_H$) of 85% to 105% after maintaining the insulation films for 1000 hours at a temperature of 85° C. and humidity of 85%. Meanwhile, it was seen that the insulation films of Comparative Examples 1 to 6 had elongation ($E_H$) of only approximately 75% to 82% under a severe condition after maintaining for 1000 hours under a temperature of 85° C. and humidity of 85%.

Test Example 3

For the insulation films prepared in Examples 1 to 6 and Comparative Examples 1 to 6, a heat contraction rate, flexibility after maintaining for 1000 hours under a condition of a temperature of 85° C. and humidity of 95%, and appearance after maintaining for 1000 hours under a condition of a temperature of 85° C. and humidity of 85% were evaluated, and the results are shown in the following Table 4.

Specific evaluation criteria on the flexibility and the appearance are as follows.

1. Evaluation on Flexibility

Under a condition of a temperature of 85° C. and humidity of 95%, the number of times of the insulation film was using a sliding movement method until the conductor resistance increased by 10% or greater compared to an existing status.

⊚: 100,000 times or greater, ○: 70,000 times to 100,000 times, Δ: 50,000 times to 70,000 times, X: 50,000 times or less 2. Evaluation on Appearance Occurrences of delamination under a condition of a temperature of 85° C. and humidity of 85% were evaluated.

◎: no delamination for 2,000 hours or longer, ○: delamination occurred at 1,500 hours to 2,000 hours, Δ: delamination occurred at 1,000 hours to 1,500 hours, X: delamination occurred at 1,000 hours or less

TABLE 4

| Category | Curing Agent Content (Parts by Weight) | MD (%) | TD (%) | MD/TD | Flex-ibility | Appear-ance |
|---|---|---|---|---|---|---|
| Example 1 | 8 | 0.30 | 0.10 | 3 | ◎ | ◎ |
| Example 2 | 10 | 0.20 | 0.08 | 2.5 | ◎ | ◎ |
| Example 3 | 14 | 0.20 | 0.08 | 2.5 | ◎ | ◎ |
| Example 4 | 18 | 0.20 | 0.08 | 2.5 | ○ | ○ |
| Example 5 | 22 | 0.20 | 0.08 | 2.5 | ○ | ○ |
| Example 6 | 26 | 0.20 | 0.08 | 2.5 | ○ | ○ |
| Comparative Example 1 | 1 | 0.75 | 0.25 | 3 | Δ | Δ |
| Comparative Example 2 | 3 | 0.60 | 0.20 | 3 | ○ | ○ |
| Comparative Example 3 | 5 | 0.40 | 0.15 | 2.67 | ○ | ○ |
| Comparative Example 4 | — | 0.80 | 0.30 | 2.67 | Δ | Δ |
| Comparative Example 5 | 14 | 0.35 | 0.13 | 2.69 | Δ | Δ |
| Comparative Example 6 | 14 | 0.35 | 0.12 | 2.92 | Δ | Δ |

As shown in Table 4, the insulation films of Examples 1 to 6 according to the present disclosure had an MD of approximately 0.2% to 0.3% and a TD of approximately 0.08% to 0.10%, which means having a significantly lower heat contraction rate compared to the insulation films of Comparative Examples 1 to 6, and it was also seen that flexibility and appearance properties were very superior as well.

Test Example 4

After providing a conductor having a thickness of 35 μm between adhesive layers of the two insulation films prepared in Examples 1 to 6 and Comparative Examples 1 to 6, the result was laminated at a rate of 0.8 m/min to prepare a flexible flat cable. After that, peel strength (P/S) after maintaining for 1000 hours under a condition of a temperature of 85° C. and humidity of 85% was measured, and the results are shown in the following Table 5.

TABLE 5

| Category | Curing Agent Content (Parts by Weight) | High Temperature High Humidity P/S (kg/cm) |
|---|---|---|
| Example 1 | 8 | 0.80 |
| Example 2 | 10 | 0.90 |
| Example 3 | 14 | 1.00 |
| Example 4 | 18 | 0.90 |
| Example 5 | 22 | 0.82 |
| Example 6 | 26 | 0.75 |
| Comparative Example 1 | 1 | 0.30 |
| Comparative Example 2 | 3 | 0.50 |
| Comparative Example 3 | 5 | 0.70 |
| Comparative Example 4 | — | 0.30 |
| Comparative Example 5 | 14 | 0.20 |
| Comparative Example 6 | 14 | 0.35 |

As shown in Table 5, it was seen that the insulation films of Examples 1 to 6 according to the present disclosure had a very high peel strength value compared to the insulation films of Comparative Examples 1 to 6 even under a severe condition.

Hereinbefore, embodiments of the present disclosure have been described in detail, however, the scope of a right of the present disclosure is not limited thereto, and it will be obvious to those skilled in the art that various modifications and changes may be made within the scope that does not depart from technological ideas of the present disclosure described in the claims.

REFERENCE NUMERAL

1: Adhesive Layer, 2: Interlayer, 3: Resin Layer, 10: Conductor

INDUSTRIAL APPLICABILITY

The present disclosure relates to an insulation film and a flexible flat cable (FFC) using the insulation film.

The invention claimed is:

1. An insulation film in which an adhesive layer, an interlayer and a resin layer are consecutively laminated, wherein a ratio of tensile strength after maintaining for 1000 hours under a condition of a temperature of 85° C. and humidity of 85% ($T_H$) with respect to tensile strength at room temperature ($T_R$) of the insulation film ($T_H/T_R$) is from 0.9 to 1.0.

2. The insulation film of claim 1, wherein the tensile strength ($T_H$) of the insulation film after maintaining for 1000 hours under a condition of a temperature of 85° C. and humidity of 85% is from 115 MPa to 135 MPa.

3. The insulation film of claim 1, wherein the tensile strength ($T_R$) of the insulation film at room temperature is from 130 MPa to 140 MPa.

4. The insulation film of claim 1, wherein a machine direction (MD) contraction rate of the insulation film is from 0.20% to 0.35%, a transverse direction (TD) contraction rate of the insulation film is from 0.08% to 0.13%, and a ratio of the machine direction contraction rate with respect to the transverse direction contraction rate (MD/TD) of the insulation film is from 2.5 to 3.0.

5. The insulation film of claim 1, wherein the adhesive layer includes a polymer resin.

6. The insulation film of claim 5, wherein the polymer resin includes a polyester resin.

7. The insulation film of claim 6, wherein the polymer resin includes two or more types of polyester resins, and the polyester resin includes a first polyester resin having a molecular weight of 1,000 to 15,000 and a second polyester resin having a molecular weight of 20,000 to 35,000.

8. The insulation film of claim 1, wherein the adhesive layer includes at least one or more types of curing agents, and the curing agent is a compound including at least one functional group among an isocyanate group, a block isocyanate group and a carbodiimide group.

9. The insulation film of claim 8, wherein the curing agent is included in an amount of 6 parts by weight to 60 parts by weight with respect to 50 parts by weight of a polymer resin.

10. The insulation film of claim 1, wherein the adhesive layer further includes one or more types of flame-retardant fillers, and the flame-retardant filler is one or more types selected from the group consisting of a halogen flame retardant, a phosphorous-based flame retardant, a nitrogen-based flame retardant, a metal-based flame retardant and an antimony-based flame retardant.

11. An insulation film in which an adhesive layer, an interlayer and a resin layer are consecutively laminated, wherein elongation of the insulation film after maintaining for 1000 hours under a condition of a temperature of 85° C. and humidity of 85% ($E_H$) is from 85% to 105%.

12. The insulation film of claim 11, wherein a machine direction (MD) contraction rate of the insulation film is from 0.20% to 0.35%, a transverse direction (TD) contraction rate of the insulation film is from 0.08% to 0.13%, and a ratio of the machine direction contraction rate with respect to the transverse direction contraction rate (MD/TD) of the insulation film is from 2.5 to 3.0.

13. The insulation film of claim 11, wherein the adhesive layer includes a polyester resin.

14. The insulation film of claim 13, wherein the adhesive layer includes two or more types of polyester resins, and the polyester resin includes a first polyester resin having a molecular weight of 1,000 to 15,000 and a second polyester resin having a molecular weight of 20,000 to 35,000.

15. The insulation film of claim 11, wherein the adhesive layer includes at least one or more types of curing agents, and the curing agent is a compound including at least one functional group among an isocyanate group, a block isocyanate group and a carbodiimide group.

16. The insulation film of claim 15, wherein the curing agent is included in 6 parts by weight to 60 parts by weight with respect to 50 parts by weight of a polymer resin.

17. The insulation film of claim 11, wherein the adhesive layer further includes one or more types of flame-retardant fillers, and the flame-retardant filler is one or more types selected from the group consisting of a halogen flame retardant, a phosphorous-based flame retardant, a nitrogen-based flame retardant, a metal-based flame retardant and an antimony-based flame retardant.

18. A flexible flat cable comprising:
a conductor; and
the insulation film of claim 1 laminated on at least one surface of the conductor.

19. The flexible flat cable of claim 18, wherein a peel strength value of the conductor for the adhesive layer after maintaining for 1000 hours under a condition of a temperature of 85° C. and humidity of 85% is from 0.75 kg/cm to 1.00 kg/cm.

20. A flexible flat cable comprising:
a conductor; and
the insulation film of claim 11 laminated on at least one surface of the conductor.

21. The flexible flat cable of claim 20, wherein a peel strength value of the conductor for the adhesive layer after maintaining for 1000 hours under a condition of a temperature of 85° C. and humidity of 85% is from 0.75 kg/cm to 1.00 kg/cm.

* * * * *